United States Patent
Taketani et al.

(10) Patent No.: US 6,597,407 B1
(45) Date of Patent: Jul. 22, 2003

(54) CONTOUR CORRECTION CIRCUIT AND CONTOUR CORRECTION METHOD

(75) Inventors: Nobuo Taketani, Hyogo (JP); Atsuhisa Kageyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/286,342

(22) Filed: Apr. 5, 1999

(30) Foreign Application Priority Data

Apr. 3, 1998 (JP) .......................................... 10-091177

(51) Int. Cl.$^7$ .............................................. H04N 5/208
(52) U.S. Cl. ........................ 348/625; 348/627; 348/630
(58) Field of Search ................................. 348/607, 624, 348/622, 623, 625, 627, 26, 630, 631, 252; 382/266, 270; H04N 5/208, 5/21

(56) References Cited

U.S. PATENT DOCUMENTS 4,414,564 A * 11/1983 Hitchcock .................... 348/625

FOREIGN PATENT DOCUMENTS

| EP | 241246 | 10/1987 |
| EP | 478377 | 4/1992 |
| JP | 2532605 | 6/1996 |

OTHER PUBLICATIONS

International Search Report, Application No. PCT/JP/99/01587, dated Aug. 11, 1999.

* cited by examiner

*Primary Examiner*—Sherrie Hsia
(74) *Attorney, Agent, or Firm*—RatnerPrestia

(57) ABSTRACT

A contour correction circuit includes a delay circuit for delaying an input video signal, a corrected waveform generating circuit for generating a contour correction signal out of the input video signal, a variable amplifier for controlling an amplitude of the contour correction signal, a contour control circuit for outputting a gain control signal for controlling a gain in the variable amplifier, and a first adding circuit for adding an output signal of the delay circuit to an output of the amplifier. When an amplitude-change in an edge portion of the input video signal is over a given level, the smaller amount of contour is corrected at the larger amplitude change. Therefore, even if a signal of a high contrast ratio is adjacent to a signal of a low contrast ratio, desirable contour corrections can be provided to respective signal components.

38 Claims, 9 Drawing Sheets

FIG. 2

(a) Luminance signal of the input video signal 116 

(b) Output signal from high pass filter 105 

(c) Output signal from full-wave rectifying circuit 106 

Reference voltage 119

(d) Output signal from coring circuit 107 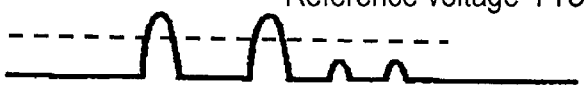

(e) Output signal from large signal selection circuit 108 

(f) Output signal from small signal selection circuit 109 

(g) Output signal from first waveform widening circuit 112 

(h) Output signal from subtracting circuit 113 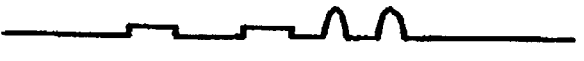

(i) Output signal from second waveform widening circuit 114 

(j) Output signal from corrected waveform circuit 102 

(k) Output signal from variable amplifier 103 

(l) Output video signal 118 

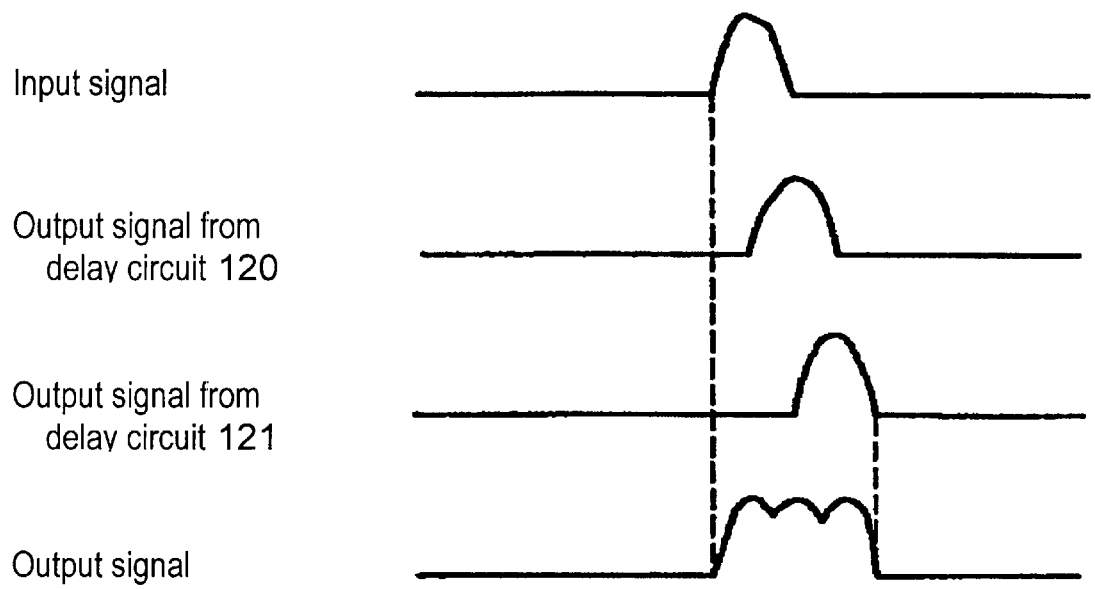

FIG. 6 PRIOR ART

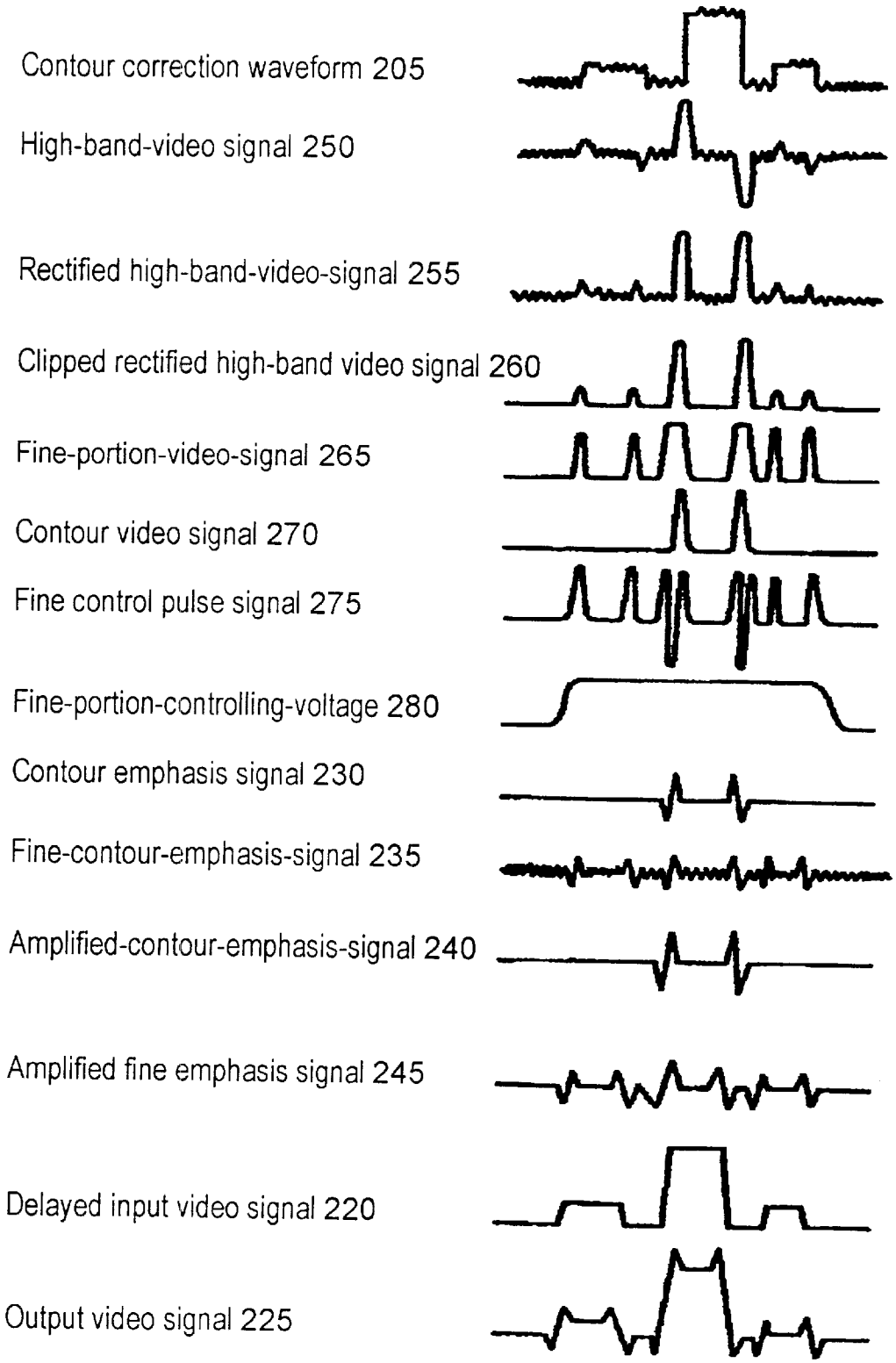

Contour correction waveform 205

High-band-video signal 250

Rectified high-band-video-signal 255

Clipped rectified high-band video signal 260

Fine-portion-video-signal 265

Contour video signal 270

Fine control pulse signal 275

Fine-portion-controlling-voltage 280

Contour emphasis signal 230

Fine-contour-emphasis-signal 235

Amplified-contour-emphasis-signal 240

Amplified fine emphasis signal 245

Delayed input video signal 220

Output video signal 225

FIG. 8 PRIOR ART
Input video signal 200 
Contour correction waveform 205 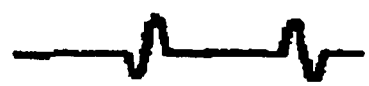
Contour correction signal 215 
Displayed input video signal 220 
Output video signal 225 

CONTOUR CORRECTION CIRCUIT AND CONTOUR CORRECTION METHOD

TECHNICAL FIELD

The present invention relates to a contour correction circuit for displaying a sharp picture free from degrading picture quality regardless of any kinds of scenes supplied to a video display apparatus including a television receiver, and also relates to a contour correction method.

PRIOR ART

The technique to realize sharper pictures has been pursued since the advent of television receivers (TV) in the market. Recently, the screen of TV has become larger and larger, which emphasizes particularly an importance of this technique, i.e. the technique of enhancing sharpness of a reproduced-image on the screen. Further, digital technique introduced in TV allows accurate time control as well as fine control over picture quality, so that further sharper and clearer pictures are demanded.

A conventional contour correction circuit is described hereinafter with reference to the accompanying drawings.

FIG. 7 is a block diagram of a conventional contour correction circuit. FIG. 8 illustrates an operational concept of the circuit shown in FIG. 7.

In FIG. 7, corrected-waveform-generating-circuit 1 generates contour correction waveform 205 by differentiating video-input-signal 200 in twice. Variable amplifier 2 receives an output signal from generator 1 and controls amplitude of contour correction signal 215 responsive to a size of control signal 210 determined by a picture quality controller. Picture quality controller 3 determines a gain of amplifier 2. Delay circuit 4 synchronizes contour correction signal 215 tapped off from amplifier 2 with video input signal 200. Adding circuit 5 adds delayed video input signal 220 tapped off from delay circuit 4 to contour correction signal 215 so that video output signal 225 with sharpness is supplied. The operation of the circuit discussed above is described hereinafter.

Corrected-waveform-generating-circuit 1 receives input video signal 200. As shown in FIG. 8, signal 200 is twice differentiated in generator 1 so that contour corrected waveform 205 is generated. Variable amplifier 2 amplifies corrected waveform 205 responsive to a size of control signal 210 determined by picture quality controller 3. Contour corrected signal 215 is thus supplied from amplifier 2. Delay circuit 4 delays the input video signal to be synchronized with signal 215 delayed by generator 1 and amplifier 2. Adding circuit 5 adds delayed video input signal 220 tapped off from delay circuit 4 to contour correction signal 215 so that video output signal 225 with sharpness due to contour correction is supplied.

However, in the circuit structure discussed above, once the picture quality controller determines a control voltage at a certain level, amount of contour correction stays constant regardless of any input video signals. Therefore, in the case of a blank picture, e.g. when a picture shows only a blue sky, noises are conspicuous.

In order to address this problem, a method for automatically controlling the contour correction amount with regard to a detected amount was proposed. The detected amount corresponds to a fine portion out of an entire picture, e.g. lawn portion in the entire picture, the lawn portion having a little change of the amplitude corresponding to the edge portion of the input video signal.

The Japanese Letters of Patent No. 2532605 teaches the method as discussed above in FIG. 5 and FIG. 6 illustrating a conventional contour correction circuit.

Input video signal 200 is fed in parallel into delay circuit 4, first corrected waveform generating circuit 11, second corrected waveform generating circuit 12 and high pass filter 15. Delay circuit 4 adjusts the timing of input video signal 200 to meet a delay of the circuit system, and outputs the resultant delayed video signal 200 to adding circuit 10.

First-corrected-waveform-generating-circuit 11 produces contour-emphasis-signal 230 with regard to a signal having a high contrast ratio, i.e. a large change in amplitude corresponding to a crisp edge portion of signal 200, and supplies signal 230 to first variable amplifier 13. A noise component included in input video signal 200 is too little to be carried by signal 230. Amplifier 13 controls the amplitude of signal 230 responsive to a voltage determined by controller 3, and outputs the resultant signal to adding circuit 10 as the amplified-contour-emphasis-signal 240.

Second-corrected-waveform-generating-circuit 12 produces fine-contour-emphasis-signal 235 with regard to a small amplitude portion out of signal 200, and sends it to second variable amplifier 14.

Amplifier 14 controls the amplitude of emphasis signal 235 responsive to the sum of output voltages from controller 3 and smoothing circuit 21. Adding circuit 10 adds signal 240 and signal 245 to signal 220, then outputs video signal 225 undergone the contour correction process.

A method of obtaining fine-portion-controlling-voltage 280 that controls a gain of second variable amplifier 14 is now described hereinafter.

First, high pass filter 15 extracts high-frequency-portion out of input video signal 200 so that high-band-video signal 250 is formed.

Second, full-wave-rectifying circuit 16 rectifies high band video signal 250 so that rectified high-band-video-signal 255 is formed. First clipping circuit 17 removes subtle signals from signal 255 so that clipped and rectified high-band-video-signal 260 is obtained.

Then, signal 260 is fed into limiting circuit 18 and second clipping circuit 19 respectively. Limiting circuit extracts fine signals only so that fine-portion-video-signal 265 is formed.

Second clipping circuit 19 extracts edge portions having high contrasts so that contour video signal 270 is obtained. Fine-portion-video-signal 265 includes contour-portion besides fine-portion in a strict sense. Therefore, subtracting circuit 20 subtracts signal 270 from signal 265 to obtain an accurate fine-portion-signal-component, and then outputs fine-controlling-pulse-signal 275.

Smoothing circuit 21 smoothes signal 275 so that a voltage responsive to an amount of fine portions can be obtained. Accordingly, this voltage is lowered at a picture having relatively smaller fine-portion. Since this voltage controls the amplitude of the fine-portion-emphasis-signal 235, the fine-portion is not so much emphasized, and noises are reduced. On the contrary, when a picture has relatively greater fine-portion signals, the fine-portion is strongly emphasized so that the picture can be sharply enhanced.

The circuit structure discussed above still has the following problem.

Fine-portion-controlling voltage 280 averaged by the smoothing circuit controls the gain of second variable amplifier 14. Therefore, when a signal having a high contrast ratio such as input video signal 200 shown in FIG. 6 is adjacent to a signal having a low contrast ratio such as a signal corresponding to vague edge portion where an amplitude changes a little, fine-portion-controlling voltage 280 is corrected only at its average value. Thus the fine-portion-emphasis-signal is also added to output video signal 225 having a high contrast ratio as shown in FIG. 6.

As a result, a picture port ion having a high contrast is provided with unnecessary edge enhancement, and the noises of this portion are also emphasized.

DISCLOSURE OF THE INVENTION

The present invention addresses the problem discussed above and aims to provide a contour correction circuit having the following structure and also provide a contour correction method using the same circuit.

The contour correction circuit of the present invention comprises the following element:

(a) a delay circuit for delaying an input video signal;

(b) corrected waveform generating circuit for generating a contour correction signal using the input video signal;

(c) a variable amplifier for controlling an amplitude of the contour correction signal;

(d) contour control circuit for supplying a gain control signal that controls a gain of the variable amplifier during a time covering the waveform corresponding to edge portion of contour;

wherein the contour correction circuit includes;

(d-1) a scene determination circuit for removing noises and detecting an amplitude change as well as waveform width in an edge portion of the input video signal; and (d-2) a control signal generator corrects the smaller amount of contour at the greater change in the amplitude when an output signal is over a given level, and the control signal generator corrects the larger amount of contour at the greater change in the amplitude when an output signal is less than the given level;

(e) a first adding circuit for adding an output signal from the delay circuit and an output signal from the variable amplifier.

In other words, items (d-1) and (d-2) realize the following contour correction.

1. Detect a time corresponding to edge portion of a contour-picture-signal of an object in a picture as well as an amplitude change in the contour-picture-signal.

2. While the contour is drawn, correction amount thereof is controlled so that the smaller amount is corrected at the greater amplitude of the picture-signal.

As a result, users can always watch sharp pictures free from degradation of picture quality on TVs or other video display apparatuses regardless of whatever video scenes are fed thereto.

Further, a contour can be corrected flexibly to users' tastes.

BRIEF DESCRIPTION OF THE DRAWINGS

FIG. 2 illustrates an operation of the contour correction circuit in accordance with the first exemplary embodiment of the present invention.

FIG. 3(*b*) illustrates an operation of the waveform widening circuit in accordance with the first exemplary embodiment of the present invention.

FIG. 6 illustrates an operation of the circuit shown in FIG. 5.

FIG. 8 illustrates an operation of the circuit shown in FIG. 7.

DETAILED DESCRIPTION OF PREFERABLE EMBODIMENTS

Exemplary Embodiment 1

The first exemplary embodiment of the present invention is described hereinafter with reference to FIG. 1.

Figure 1:
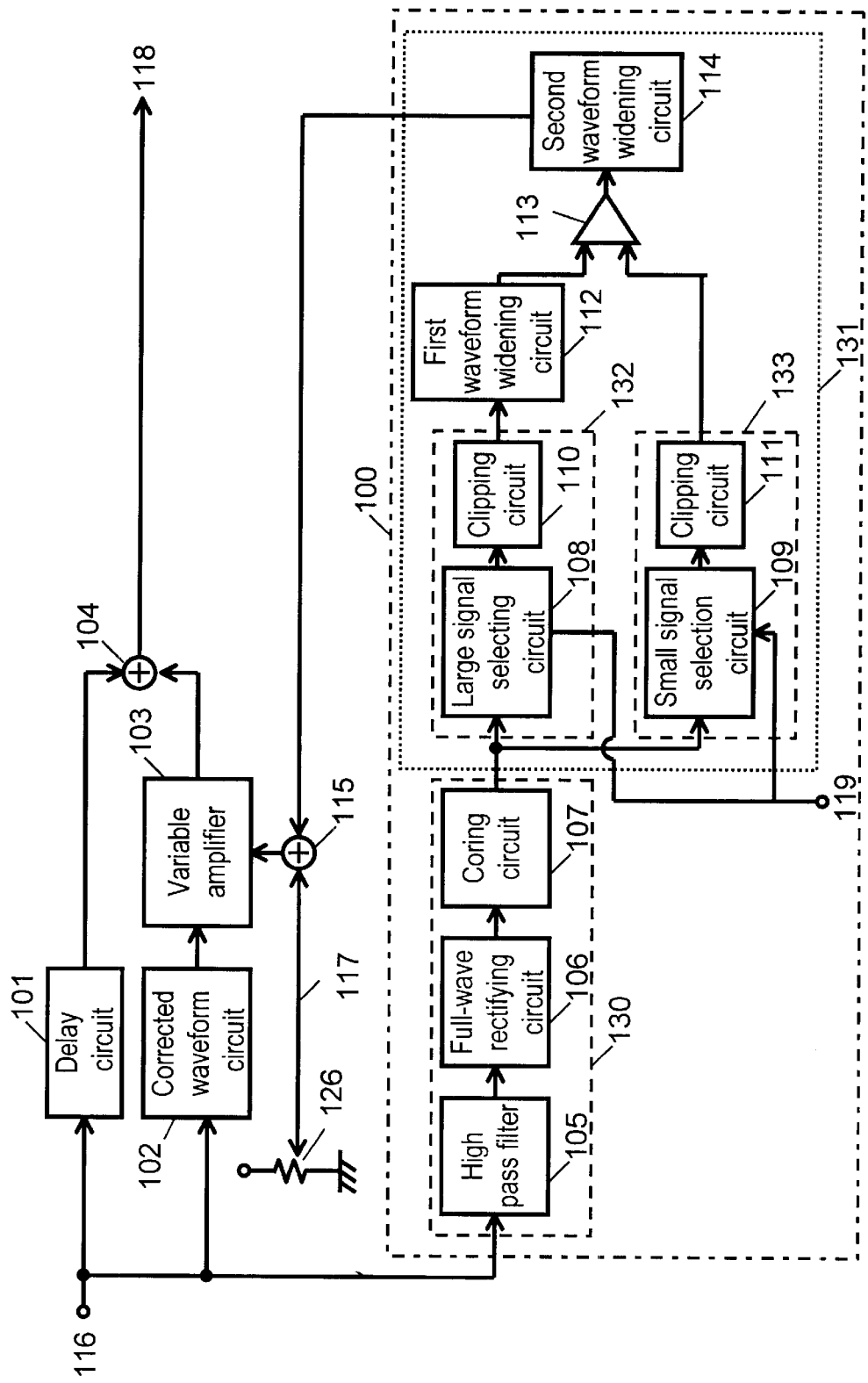
FIG. 1 is a block diagram of a contour correction circuit in accordance with a first exemplary embodiment of the present invention.

In FIG. 1, delay circuit 101 delays an input video signal for synchronizing. Corrected waveform generating circuit 102 generates a correction signal to be added to the input video signal. Variable amplifier 103 receives an output signal from generating circuit 102, controls an amplitude and synchronizes the input signal with the control signal. First adding circuit 104 adds an output signal from delay circuit 101 to an output signal from amplifier 103. High pass filter 105 extracts a high band component of the input video signal. Full-wave-rectifying circuit 106 receives an output signal from high pass filter 105 and rectifies the output signal into the full wave. Coring circuit 107 receives an output signal of rectifying circuit 106 and removes amplitudes of small signals that fall under noises.

Scene determination circuit 130 comprises high pass filter 105, full-wave-rectifying circuit 106 and coring circuit 107, and removes noises to detect an amplitude change corresponding to an edge portion of the input video signal as well as a waveform width.

Large signal selecting circuit 108 receives an output signal from coring circuit 107 and then outputs a signal larger than a reference voltage 119. Clipping circuit 110 receives an output signal from selecting circuit 108 and performs a clip operation.

Slicing circuit 132 comprises large-signal-selecting-circuit 108 and clipping circuit 110, and outputs a signal including a component larger than the reference voltage 119.

Small signal selecting circuit 109 receives an output signal from coring circuit 107, and output a signal including a component smaller than the reference voltage 119. Clipping circuit 111 receives an output signal of circuit 109 and performs a clip operation.

Limiting circuit 131 comprises small signal selecting circuit 109 and clipping circuit 111 and output a signal having a component smaller than the reference voltage 119.

First waveform width widening circuit 112 receives an output signal from clipping circuit 110 and widens a waveform width thereof. Subtracting circuit 113 subtracts an output signal of limiting circuit 113 from widening circuit 112 by synchronizing the signals. Second waveform width widening circuit 114 receives an output signal from adding circuit 113 and widens the width of waveform. Second adding circuit 115 adds an output signal of circuit 114 to control signal 117 forming a dc voltage predetermined by a user with picture quality controller 126. The input video signal 116 is a luminance signal. Control signal generating circuit 131 comprises slicing circuit 132, first waveform width widening circuit 112, limiting circuit 133, subtracting circuit 113 and second waveform width widening circuit 114. This circuit 131 determines a control time and control volume thereby to generate a contour control signal.

Contour control circuit 100 comprises scene determination circuit 130 and control signal generating circuit 131, and controls a gain of variable amplifier 103 responsive to a size of amplitude of edge portion during the edge period. Picture quality controller 126 corrects a contour to users' taste.

An operation of the contour correction circuit having a construction discussed above is described hereinafter with reference to FIGS. 2 and 3.

Figure 3A:
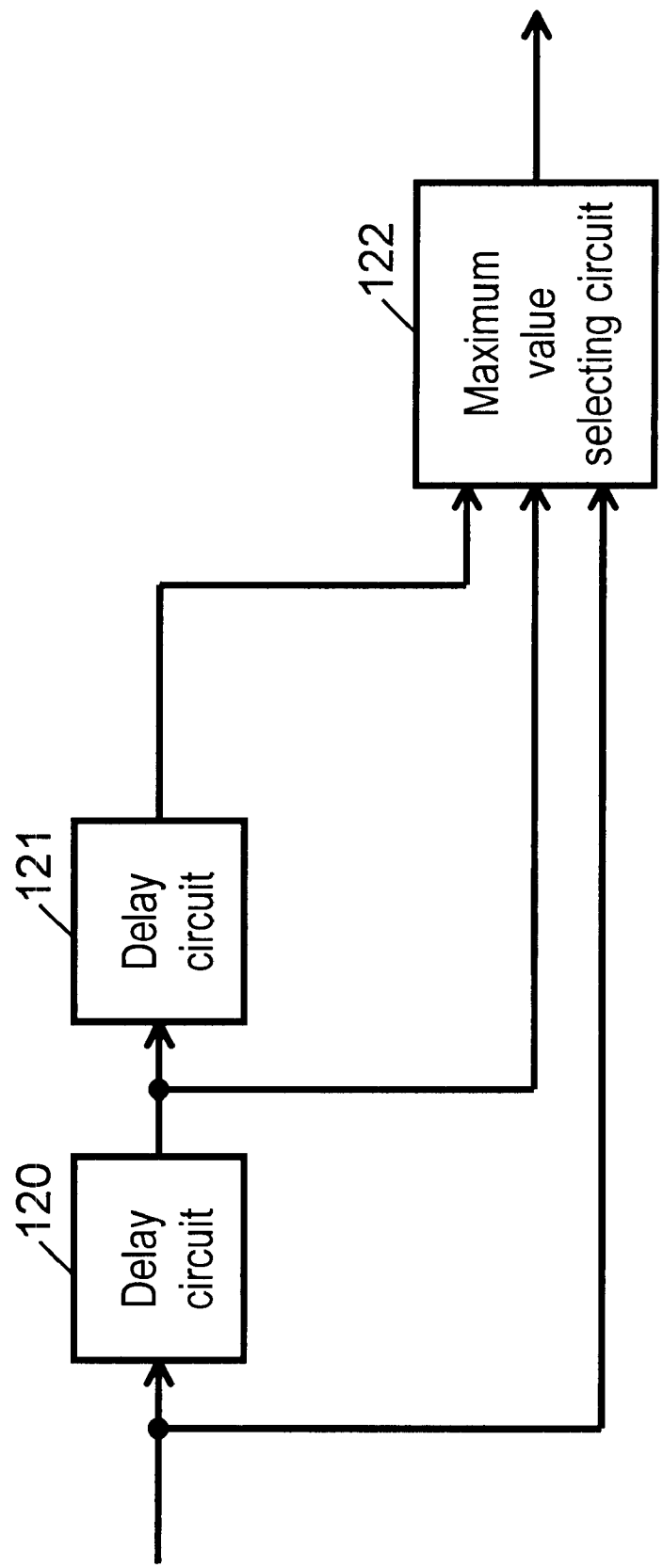
FIG. 3(*a*) is a block diagram of a waveform widening circuit in accordance with the first exemplary embodiment of the present invention.

FIG. 2 illustrates an operation of the contour correction circuit shown in FIG. 1. FIG. 3(a) is a block diagram of a first waveform widening circuit 112 and a second waveform widening circuit 114 of a contour-controlling-circuit of the present information. FIG. 3(b) illustrates an operation of the waveform-widening circuits 112 and 114 shown in FIG. 3(a).

FIG. 2(a) illustrates luminance signal 116 of an input video signal. Signal 116 includes the following three signals:

a signal with a high contrast ratio represented by a sharply defined edge indicating great changes in amplitude;

a signal with a low contrast ratio represented by a vaguely defined edge indicating small changes in amplitude; and a signal carrying noises.

When luminance signal 116 is fed to high pass filter 105, a derivative component of this luminance signal is obtained as shown in FIG. 2(b). When the signal shown in FIG. 2(b) is fed into full-wave-rectifying circuit 106, an absolute value of the signal shown in FIG. 2(b) is obtained as shown in FIG. 2(c). When the signal shown in FIG. 2(c) is fed into coring circuit 107, a signal as shown in FIG. 2(d) is obtained. Noise signals in general, have so small amplitudes that a coring process can remove the noise components from the signals.

Large-signal-selecting circuit 108 selectively outputs signals having higher voltages than a reference voltage 119 out of the signals tapped off from coring circuit 107. Signals so supplied from circuit 108 are shown in FIG. 2(e).

Small-signal-selecting circuit 109 selectively outputs signals having lower voltages than a reference voltage 119 out of the signals tapped off from coring circuit 107. The output signals are shown in FIG. 2(f).

Clipping circuit 110 adjusts an amplitude level of the signal tapped off from large-signal-selecting circuit 108, and the resultant signal is fed into first waveform widening circuit 112, where a waveform of the input resultant signal is widened before the signal is tapped off.

An operation of waveform-widening circuits 112 and 114 is described hereinafter with reference to FIGS. 3(a) and 3(b) by using circuit 112 as a representative.

FIG. 3(a) is a block diagram of waveform-widening-circuit 112 and FIG. 3(b) illustrates output waveforms of each section shown in the block diagram and a principle of widening a waveform width of an input signal.

Waveform-width-widening circuit 112 feeds respective output signals of two or more than two delay circuits coupled in series (e.g. first and second delay circuits 120 and 121 in this embodiment) as well as an input signal of waveform-widening-circuit 112 to maximum-value-selecting circuit 122. Maximum-value-selecting circuit 122 selects the signal having the largest amplitude at respective times and outputs it, thereby widening a waveform width of the input signal.

An output waveform supplied from first waveform-width-widening circuit 112 is shown in FIG. 2(g).

Subtracting circuit 113 subtracts the output signal shown in FIG. 2(g) from the output signal shown in FIG. 2(f) by synchronizing these two signals, and obtains a resultant signal shown in FIG. 2(h). Second waveform-width-widening circuit 114 receives the output signal from subtracting circuit 113 and outputs a resultant signal of which waveform is shown in FIG. 2(i).

Variable amplifier 103 synchronizes the corrected waveform signal [shown in FIG. 2(j)] with the contour controlling signal [shown in FIG. 2(i)], and controls an amplitude of the corrected waveform signal responsive to the contour controlling signal, then outputs a contour corrected signal undergone the amplitude control process. FIG. 2(k) shows this contour corrected signal.

First-adding-circuit 104 adds this contour corrected signal [shown in FIG. 2(k)] to the output signal from delay circuit 101, and outputs luminance signal 118 shown in FIG. 2(l) of which contour has been corrected.

The following points illustrated in FIG. 2(i) are desirably remarked.

(a) A gain, obtained from the signal of high contrast ratio, with regard to the contour correction signal is set at a small value.

(b) A gain, obtained from the signal of low contrast ratio, with regard to the contour correction signal is set at a great value.

(c) A gain with regard to noise components is set at 0 (zero).

Contour controlling circuit 100 of the present invention thus outputs a control voltage depending on the respective signals having a high contrast ratio and a low contrast ratio, even if these signals are adjacent to each other, which has caused a problem.

As a result, this control signal produces the following advantages when controlling an amplitude of a contour correction signal.

(a) little contour correction is provided to the signal having a high contrast ratio;

(b) substantial contour correction is provided to the signal having a low contrast ratio; and (c) no influence from noises.

The contour is corrected by using the signals obtained from first and second waveform-width-widening circuits 112 and 114, the contour is thus corrected responsive to the time covering the edge width of the input signal waveform. Therefore, even if a signal of a high contrast ratio is adjacent to a signal of a low contrast ratio, respective signal-components can be desirably corrected independently.

Second adding circuit 115 adds control signal 117 to the output signal from second-waveform-width-widening circuit 114 so that a predetermined offset value is provided to a gain with regard to the contour correction signal. Thus, when a user changes a dc level of control signal 117 with picture quality controller 127, the user can directly handles the gain with regard to the contour correction signal. As a result, a contour can be corrected to a user's taste.

This first exemplary embodiment thus proves that the contour correction circuit realizes the following functions.

(a) eliminating noise influence;

(b) when an amplitude-change in an edge portion of an input video signal exceeds a given level, the smaller amount of contour is corrected at the greater change in amplitude;

(c) when an amplitude change in an edge portion of an input video signal is lower than the given level, the larger amount of contour is corrected at the greater change in amplitude; and (d) when a signal of a high contrast ratio is adjacent, to a signal of a low contrast ratio, respective signal components can be provided with desirable contour corrections independently.

In this embodiment, second waveform-width-widening circuit 114 comprises two delay circuits as shown in FIG. 3; however, three or more delay circuits can also constitute the waveform-widening circuit.

In this embodiment, two waveform-width-widening circuits are employed; however, second waveform-width-widening circuit 114 can be omitted and the output from subtracting circuit 113 is fed into second adding circuit 115 instead. This structure can produce the same effect. Adding second circuit 114 would achieve more accurate contour correction.

Exemplary Embodiment 2

Figure 4:
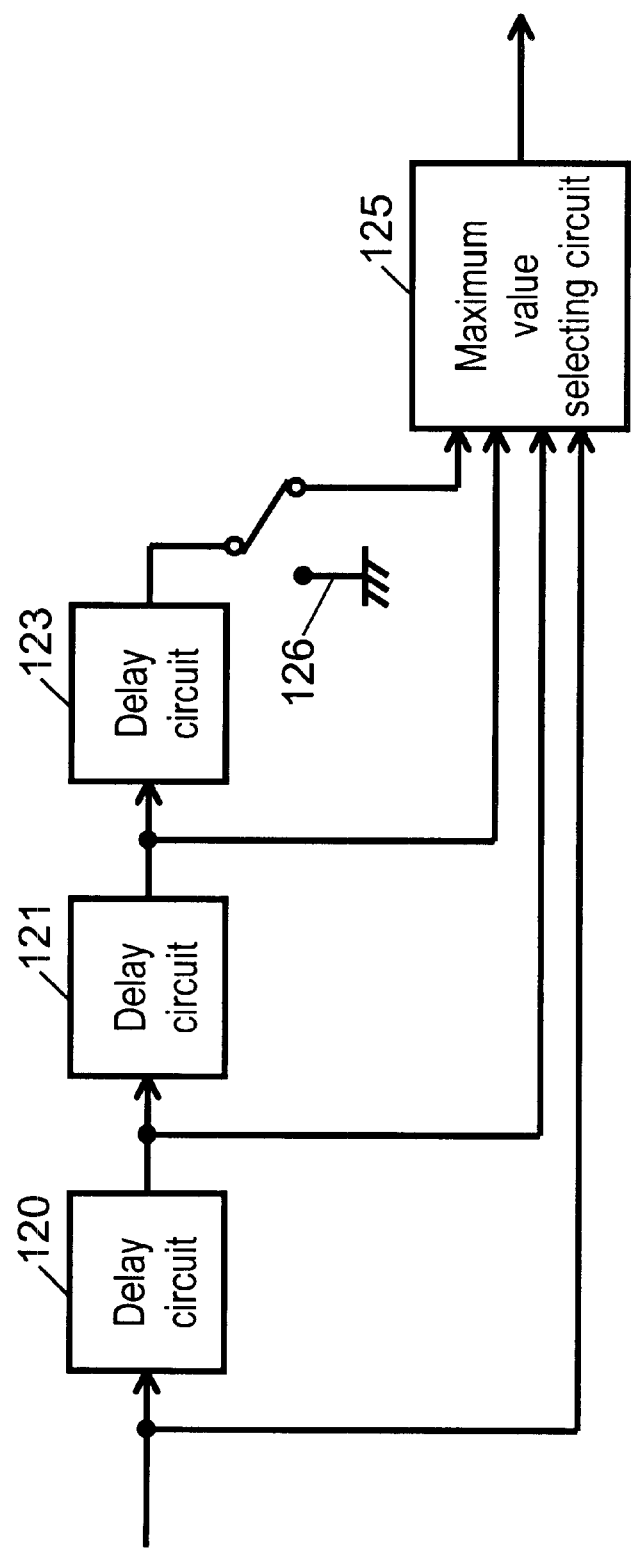
FIG. 4 is a block diagram of a waveform widening circuit in accordance with a second exemplary embodiment of the present invention.
Figure 5:
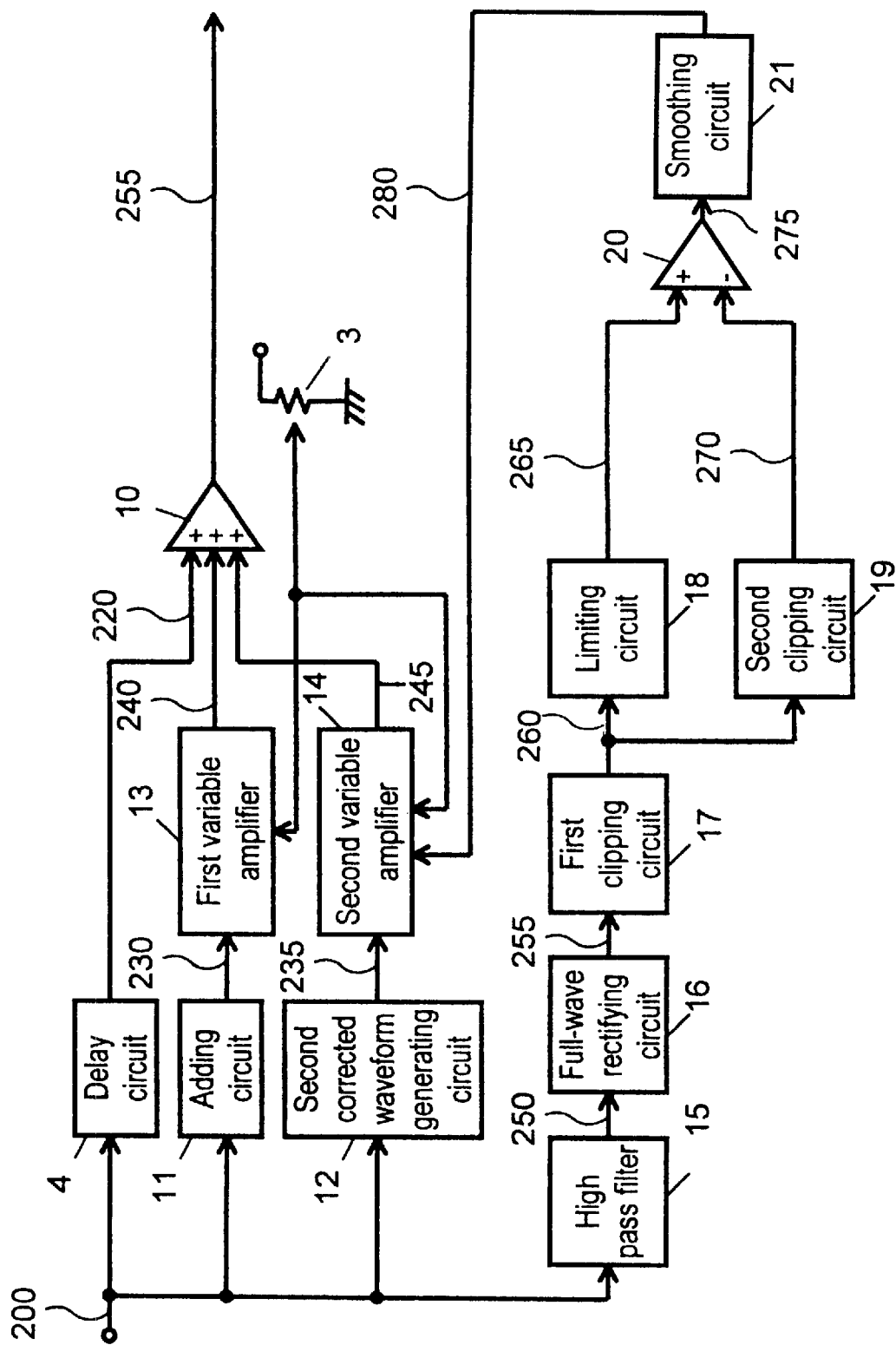
FIG. 5 is a block diagram of a conventional contour correction circuit.
Figure 7:
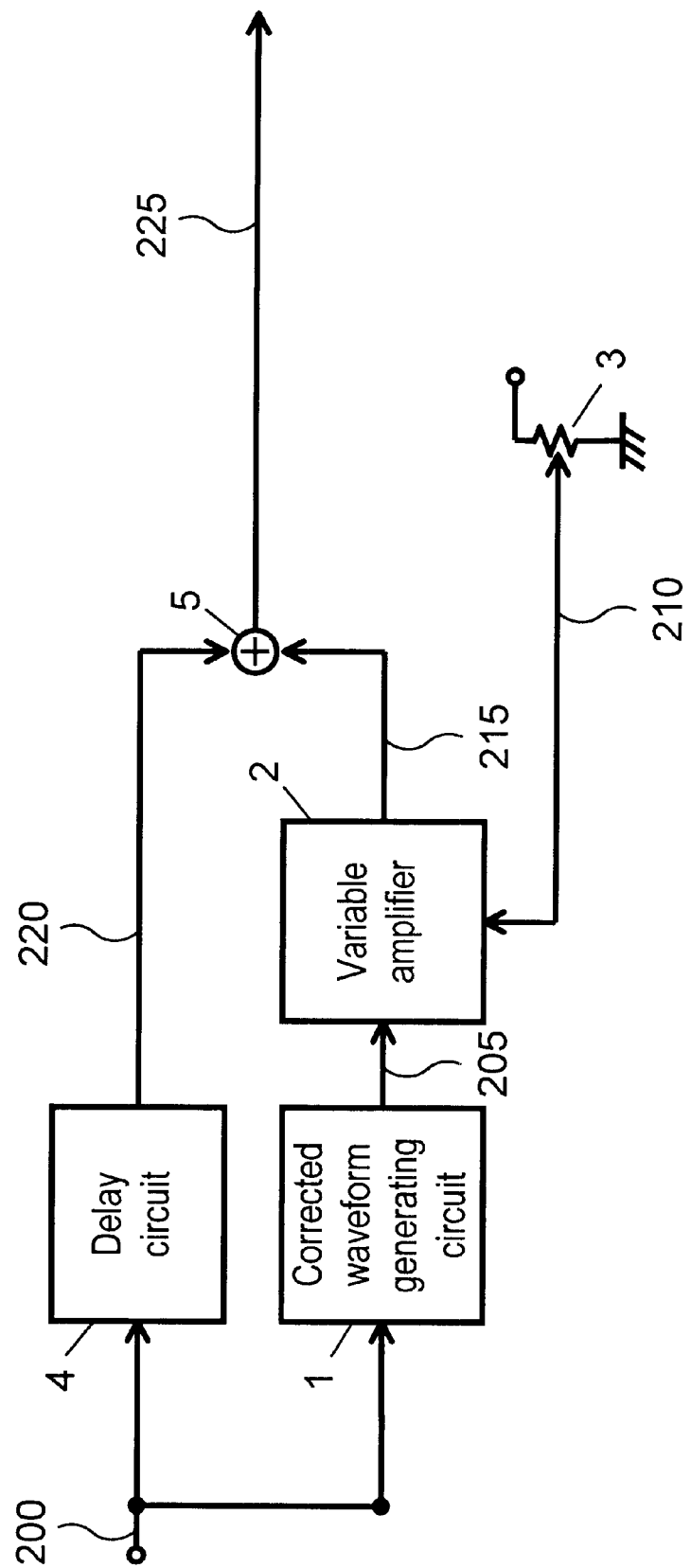
FIG. 7 is another block diagram of a conventional contour correction circuit.

Waveform-width-widening circuits 112 and 114 are replaced with circuits represented by a block diagram shown in FIG. 4. The other structure is the same as the first exemplary embodiment.

The second exemplary embodiment introduces a contour-controlling circuit with which a waveform-width of a signal supplied from the controlling circuit can be flexibly adjusted so that a contour can be corrected to user's taste.

FIG. 4 is another block diagram of first waveform-width-widening circuit 112 and second waveform-width-widening circuit 114.

The waveform-width-widening circuit shown in FIG. 4 has additional third delay circuit 123 and selecting circuit 124 to the structure shown in FIG. 3(a), and the second embodiment replaces maximum-value-selecting circuit 122 with another maximum-value-selecting circuit 125 having four input terminals.

An operation of the waveform-width-widening circuit shown in FIG. 4 is described hereinafter.

When a connection of selecting circuit 124 is switched over by a user, one of the input terminals of maximum-value-selecting circuit 125 is coupled to ground 126 so that an output signal from third delay circuit 123 is not supplied to selecting circuit 124. As a result, the waveform-width of an output signal from the waveform-width-widening circuit can be adjustable so that the contour can be corrected to user's taste.

The waveform-width-widening circuit shown in FIG. 3(a) can be replaced with either one of the waveform-width-widening circuits employed in the second exemplary embodiment with keeping the same effect.

In the waveform-width-widening-circuit shown in FIG. 4, if another selecting circuit than selecting circuit 124 would be coupled to another input terminal of maximum-value-selecting circuit 125 than that of selecting circuit 124, the waveform-width can be further flexibly adjusted.

In the exemplary embodiments discussed above, the contour correction circuit can be entirely digitized so that time factors can be accurately controlled. As a result, synchronizing processes in the adding circuit and the subtracting circuit, among others, can be conducted with ease and adding/subtracting can be accurately calculated. The digitization in the circuits would prevent each circuit from being deviated from the timing due to aging and temperature-dependent factors of the components.

When an accurate contour correction is required, digital technique is desirably introduced to the present invention.

In the exemplary embodiments discussed above, specific circuits are introduced for the explanatory purpose. If a correction method of picture contour employs the same operational principle as the present invention, the same effect can be produced.

INDUSTRIAL APPLICABILITY

The present invention introduces a contour controlling circuit to a contour correction circuit, which provides the correction circuit with the following functions.

(a) eliminating noises, detecting a change amount in amplitude corresponding to an edge portion of an input video signal and a waveform-width at an edge portion of the input video signal;

(b) outputting a control signal during a time covering the waveform width;

(c) when a change amount in amplitude at the edge portion of the input video signal is over a given level, a contour correction is controlled so that the smaller amount is corrected at the greater change amount in amplitude;

(d) when a change amount in amplitude at the edge portion of the input video signal is less than a given level, a contour correction is controlled so that the larger amount is corrected at the greater change amount in amplitude;

As a result, a picture contour can be corrected to user's taste regardless of whatever video signals representing any scenes are fed into a TV, including the case where a signal with a high contrast ratio is adjacent to a signal with a low contrast ratio.

Users can always watch sharp pictures on video display apparatuses including TVs free from degradation of picture quality regardless of whatever scenes are fed. The present invention thus can provide a great practical advantage.

Description of Marks

| | |
|---|---|
| 1 | corrected waveform generating circuit |
| 2. | variable amplifier |
| 3. | picture quality controller |
| 4. | delay circuit |
| 5. | adding circuit |
| 10. | subtracting circuit |
| 11. | adding circuit |
| 12. | second corrected waveform generating circuit |
| 13. | first variable amplifier |
| 14. | second variable amplifier |
| 15. | high pass filter |
| 16. | full-wave-rectifying circuit |
| 17. | first clipping circuit |
| 18. | limiting circuit |
| 19. | second clipping circuit |
| 20. | subtracting circuit |
| 21. | smoothing circuit |
| 100. | contour correction circuit |
| 101 | delay circuit |
| 102. | corrected waveform circuit |
| 103. | variable amplifier |
| 104. | first adding circuit |
| 105. | high pass filter |
| 106. | full-wave rectifying circuit |
| 107. | coring circuit, |
| 108. | large signal selecting circuit |
| 109. | small signal selecting circuit |
| 110. | clipping circuit |

-continued

| | |
|---|---|
| 111. | clipping circuit |
| 112 | first waveform widening circuit |
| 113. | subtracting circuit |
| 114. | second waveform widening circuit |
| 115. | second adding circuit |
| 116. | luminance signal of the input video signal |
| 117. | control signal |
| 118 | output video signal |
| 119. | reference voltage |
| 120 | delay circuit |
| 121. | delay circuit |
| 122 | maximum value selecting circuit |
| 123. | delay circuit |
| 124. | selecting circuit |
| 125. | maximum value selecting circuit |
| 126. | ground |
| 127 | picture quality controller |
| 128 | scene determination circuit |
| 129 | control signal generating circuit |
| 130. | scene determination circuit |
| 131. | control signal generating circuit |
| 132. | slicing circuit |
| 133. | limiting circuit |
| 200. | input video signal |
| 205. | contour correction waveform |
| 210. | control signal |
| 215. | contour correction signal |
| 220. | delayed input video signal |
| 225. | output video signal |
| 226. | contour emphasis circuit |
| 230. | contour emphasis signal |
| 235. | fine-contour-emphasis-signal |
| 240. | amplified-contour-emphasis-signal |
| 245. | amplified fine emphasis signal |
| 250. | high-band-video signal |
| 255. | rectified high-band-video-signal |
| 260. | clipped rectified high-band video signal |
| 265. | fine-portion-video-signal |
| 270. | contour video signal |
| 275. | fine control pulse signal |
| 280. | fine-portion-controlling-voltage |

What is claimed is:

1. A contour correction circuit comprising:
   (a) a delay circuit for delaying an input video signal;
   (b) a corrected waveform generating circuit for generating a contour correction signal from the input video signal;
   (c) a variable amplifier for controlling an amplitude of the contour correction signal;
   (d) a contour control circuit for outputting a gain control signal for controlling a gain of the variable amplifier; and
   (e) a first adding circuit for adding an output signal from said delay circuit to an output signal from a variable amplifying signal from said variable amplifier;
   wherein said contour control circuit further comprising:
   (d-1) a scene determination circuit for generating an output signal response to an amplitude change in an edge portion of the input video signal; and
   (d-2) a control signal generating circuit for generating the gain control signal so that (i) when said output signal of said scene determination circuit is greater than a predetermined level, then, as an amount of amplitude change of the input video signal increases, an amount of contour correction decreases; and (ii) when said output signal of said scene determination circuit is less than said predetermined level, then, as said amount of amplitude change of the input video signal increases, said amount of contour correction increases.

2. The contour correction circuit as defined in claim 1, wherein said scene determination circuit further comprising:
   (d-1-1) a high-pass-filter-circuit for extracting a high band component of the input video signal;
   (d-1-2) a full-wave-rectifying-circuit for receiving an output signal from said high pass filter circuit and rectifying the output signal into a full wave thereof; and
   (d-1-3) a coring circuit for receiving an output signal from said full wave rectifying circuit and removing an amplitude of a small signal that falls under a noise.

3. The contour correction circuit as defined in claim 2, wherein said control signal generating circuit further comprising:
   (d-2-1) a slicing circuit for outputting a signal comprising a component above a reference voltage out of an amplitude change in the output signal from said scene determination circuit;
   (d-2-2) a first waveform-width-widening circuit for widening a waveform width of an output signal from said slicing circuit;
   (d-2-3) a limiting circuit for outputting a signal comprising a component below the reference voltage out of the amplitude change; and
   (d-2-4) a subtracting circuit for subtracting an output signal of said first waveform-width-widening circuit from the output signal of said limiting circuit with synchronizing the two signals, to produce the gain control signal.

4. The contour correction circuit as defined in claim 2, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

5. The contour correction circuit as defined in claim 1, wherein said control signal generating circuit further comprising:
   (d-2-1) a slicing circuit for outputting a signal comprising a component above a reference voltage out of an amplitude change in the output signal from said scene determination circuit;
   (d-2-2) a first waveform-width-widening circuit for widening a waveform width of an output signal from said slicing circuit;
   (d-2-3) a limiting circuit for outputting a signal comprising a component below the reference voltage out of the amplitude change; and
   (d-2-4) a subtracting circuit for subtracting an output signal of said first waveform-width-widening circuit from the output signal of said limiting circuit with synchronizing the two signals, to product the gain control signal.

6. The contour correction circuit as defined in claim 5, wherein said control signal generating circuit further comprising:
   a second waveform-width-widening circuit for widening a waveform width of the output signal of said subtraction circuit, to product the gain control signal.

7. The contour correction circuit as defined in claim 6, wherein said second waveform-width-widening circuit varies a waveform width of the output signal.

8. The contour correction circuit as defined in claim 7, wherein said contour correction circuit further comprising a second adding circuit disposed between said contour control circuit and said variable amplifier, wherein said second adding circuit adds a given control signal to the gain control signal, and then outputs a new gain control signal for controlling a gain of said variable amplifier.

9. The contour correction circuit as defined in claim 6, wherein said second waveform-width-widening circuit comprising:
   a plurality of delay circuits coupled in series; and
   a maximum value selecting circuit for receiving each output signal of respective said plurality of delay circuits, and selecting a maximum signal at a given time.

10. The contour correction circuit as defined in claim 9, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

11. The contour correction circuit as defined in claim 6, wherein said second waveform widening circuit comprising:
   a plurality of delay circuits coupled in series;
   a selecting circuit for selecting at least one of output terminals of said plurality of delay circuits and a grounding;
   a maximum value selecting circuit for receiving an output signal of the delay circuit other than that coupled to said selecting circuit, also receiving an output signal of said selecting circuit, and then selecting 12. The contour correction circuit as defined in claim 11, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

13. The contour correction circuit as defined in claim 6, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

14. The contour correction circuit as defined in claim 5, wherein said first waveform-width-widening circuit varies a waveform width of the output signal.

15. The contour correction circuit as defined in claim 14, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

16. The contour correction circuit as defined in claim 5, wherein said first waveform-width-widening circuit comprising:
   a plurality of delay circuits coupled in series; and
   a maximum value selecting circuit for receiving each output signal of respective said plurality of delay circuits, and selecting a maximum signal at a given time.

17. The contour correction circuit as defined in claim 16, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

18. The contour correction circuit as defined in claim 5, wherein said first waveform-width-widening circuit comprising:
   a plurality of delay circuits coupled in series;
   a selecting circuit for selecting at least one of output terminals of said plurality of delay circuits and a grounding;
   a maximum value selecting circuit for receiving an output signal of the delay circuit other than that coupled to said selecting circuit, also receiving an output signal of said selecting circuit, and then selecting and outputting a maximum signal at a given time.

19. The contour correction circuit as defined in claim 18, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

20. The contour correction circuit as defined in claim 5, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

21. The contour correction circuit as defined in claim 1, wherein said contour correction circuit further comprising a second adding circuit disposed between said contour control circuit and said variable amplifier,
   wherein said second adding circuit adds a given control signal to the gain control signal, and then outputs a new gain control signal for controlling a gain of said variable amplifier.

22. A method of contour correction comprising the steps of:
   (a) obtaining a delayed video output by delaying an input video signal;
   (b) generating a contour correction signal from the input video signal;
   (c) obtaining a variable contour correction output signal by controlling an amplitude of the contour correction signal with a gain control signal;
   (d) obtaining an output video signal of which contour is corrected by adding the delayed video output to the variable contour correction output signal,
   wherein the gain control signal is produced by a control signal generating method comprising the steps of:
      generating a scene determination output signal responsive to an amplitude change in an edge portion of the input video signal;
      generating the gain control signal so that (i) when said scene determination output signal is greater than a predetermined level, then, as an amount of amplitude change of the input video signal increases, an amount of contour correction decreases; and (ii) when said scene determination output signal is less than said predetermined level, then, as said amount of amplitude change of the input video signal increases, said amount of contour correction increases.

23. The contour correction method, as defined in claim 22, wherein said step of generating said scene determination output signal is comprising the steps of:
   (a) extracting a high band component from of the input video signal;
   (b) full wave rectifying the signal having the high band component extracted out of the input video signal; and
   (c) removing a small signal component from the a full wave rectified signal.

24. The contour correction method as defined in claim 23, wherein said gain control signal generating step comprising the step of:
   (a) obtaining a signal comprising a component below a reference voltage out of a changed amplitude in the output signal;
   (b) slicing a signal comprising a component above the reference voltage out of the changed amplitude in the output signal;
   (c) widening a waveform width of a resultant signal at step (b);
   (d) subtracting the resultant signal at step (c) from the signal obtained at step (a) by synchronizing both of these two signals; and
   (e) generating said gain control signal.

25. The contour correction method as defined in claim 23, wherein an amplitude of said contour correction signal is controlled by a resultant signal of adding said gain control signal to a given control signal.

26. The contour correction method as defined in claim 22, wherein said gain control signal generating step comprising the step of:
   (a) obtaining a signal comprising a component below a reference voltage out of a changed amplitude in the output signal;
   (b) slicing a signal comprising a component above the reference voltage out of the changed amplitude in the output signal;
   (c) widening a waveform width of a resultant signal at step (b);
   (d) subtracting the resultant signal at step (c) from the signal obtained at step (a) by synchronizing both of these two signals; and
   (e) generating said gain control signal.

27. The contour correction method as defined in claim 26, further comprising the step of generating a new gain control signal by further widening a waveform width of said gain control signal.

28. The contour correction method as defined in claim 27, wherein an amplitude of said contour correction signal is controlled by a resultant signal of adding said gain control signal to a given control signal.

29. The contour correction method as defined in claim 27, wherein the waveform width is variably widened in the step of generating the new gain control signal.

30. The contour correction method as defined in claim 29, wherein an amplitude of said contour correction signal is controlled by a resultant signal of adding said gain control signal to a given control signal.

31. The contour correction method as defined in claim 27, wherein said step of generating the new gain control signal further comprising:
   said gain control signal is formed into a plurality of delayed signals having respective different delayed amounts, wherein maximum values of amplitudes at each time of these delayed signals are selected to form a signal having a widened waveform width.

32. The contour correction method as defined in claim 31, wherein an amplitude of said contour correction signal is controlled by a resultant signal of adding said gain control signal to a given control signal.

33. The contour correction method as defined in claim 26, wherein the signal comprising a component above the reference voltage out of the changed amplitude in the scene determination output signal is sliced, and further widened waveform width of the signal is varied.

34. The contour correction method as defined in claim 33, wherein the signal comprising a component above the reference voltage out of the changed amplitude in the scene determination output signal is sliced, and is formed to a plurality of delayed signals having respective different delayed amounts, wherein maximum values of amplitudes at each time of these delayed signals are selected to form a signal having a widened waveform width.

35. The contour correction method as defined in claim 34, wherein an amplitude of said contour correction signal is controlled by a resultant signal of adding said gain control signal to a given control signal.

36. The contour correction method as defined in claim 33, wherein an amplitude of said contour correction signal is controlled by a resultant signal of adding said gain control signal to a given control signal.

37. The contour correction method as defined in claim 22, wherein an amplitude of said contour correction signal is controlled by a resultant signal of adding said gain control signal to a given control signal.

38. The contour correction method as defined in claim 22, wherein an amplitude of said contour correction signal is controlled by a resultant signal of adding said gain control signal to a given control signal.

* * * * *

UNITED STATES PATENT AND TRADEMARK OFFICE
CERTIFICATE OF CORRECTION

PATENT NO. : 6,597,407 B1
DATED : July 22, 2003
INVENTOR(S) : Nobuo Taketani et al.

It is certified that error appears in the above-identified patent and that said Letters Patent is hereby corrected as shown below:

<u>Title page,</u>
Item [57], ABSTRACT,
Line 7, after "amplifier," delete "."

<u>Column 10,</u>
Line 53, "product" should read -- produce --.
Line 60, "product" should read -- produce --.

<u>Column 11,</u>
Line 31, after the word "selecting" insert -- and outputting a maximum signal at a given time. --

<u>Column 14,</u>
Line 45, "22" should read -- 26 --.

Signed and Sealed this

Thirteenth Day of April, 2004

JON W. DUDAS
*Acting Director of the United States Patent and Trademark Office*